United States Patent [19]

Harper et al.

[11] Patent Number: 5,717,925
[45] Date of Patent: Feb. 10, 1998

[54] INFORMATION CATALOG SYSTEM WITH OBJECT-DEPENDENT FUNCTIONALITY

[75] Inventors: Lloyd Harper; Jacques Labrie, both of San Jose, Calif.

[73] Assignee: International Business Machines Corporation, Armonk, N.Y.

[21] Appl. No.: 658,402

[22] Filed: Jun. 5, 1996

Related U.S. Application Data

[63] Continuation of Ser. No. 134,355, Oct. 8, 1993, abandoned.
[51] Int. Cl.[6] .................................................. G06F 17/30
[52] U.S. Cl. .................................. 395/613; 395/614
[58] Field of Search .................... 395/600, 601–604, 395/611, 613, 614

[56] References Cited

U.S. PATENT DOCUMENTS

| | | | |
|---|---|---|---|
| 5,142,622 | 8/1992 | Owens | 395/200 |
| 5,193,185 | 3/1993 | Lanter | 395/600 |
| 5,339,434 | 8/1994 | Rusis | 395/700 |
| 5,412,802 | 5/1995 | Fujinami et al. | 395/575 |
| 5,428,792 | 6/1995 | Conner et al. | 395/700 |
| 5,437,025 | 7/1995 | Bale et al. | 395/600 |

FOREIGN PATENT DOCUMENTS

| | | | |
|---|---|---|---|
| 0 304 071 | 2/1989 | European Pat. Off. | G06F 9/46 |
| 0 472 070 A2 | 2/1992 | European Pat. Off. | G06F 15/40 |
| 0 585 813 A2 | 3/1994 | European Pat. Off. | G06F 15/40 |

*Primary Examiner*—Thomas G. Black
*Assistant Examiner*—Maria N. Von Buhr
*Attorney, Agent, or Firm*—Baker, Maxham, Jester & Meador

[57] ABSTRACT

A computer implemented information catalog database system is disclosed for cataloging information stored in one or more data storage resources under the control of one or more data processing nodes. The catalog system includes a cataloging service facility for performing one or more information cataloging functions to organize and present a graphical view of the information stored in the data storage resource. The information cataloging functions are categorized into a plurality of defined function categories. An object generation facility generates one or more meta-data objects corresponding to units of information stored in the data storage resource. The meta-data objects contain attributes defining characteristics of the information units to which they correspond and the meta-data objects are assigned to one or more of the function categories to define the information cataloging functions which may be performed on the meta-data objects. A user interface is provided for executing the information cataloging functions on the meta-data objects in response to user input.

19 Claims, 14 Drawing Sheets

```
:COMMENT.----------------------------------
:COMMENT. defines a business group
:COMMENT.----------------------------------
:COMMENT.
:ACTION.OBJTYPE(ADD)
:OBJECT.TYPE(BUSNGRP) CATEGORY(GROUPING) EXTNAME(Business group)
    PHYNAME(BUSNGRP) ICOFILE(BUSGICON)
:PROPERTY.SHRTNAME(UUICLASS) DT(V) DL(50) UUISEQ(1) NULLS(N)
    EXTNAME(UUI Class)
:PROPERTY.SHRTNAME(UUIQUAL1) DT(V) DL(40) UUISEQ(2) NULLS(N)
    EXTNAME(UUI qualifier 1)
:PROPERTY.SHRTNAME(UUIQUAL2) DT(V) DL(40) UUISEQ(3) NULLS(N)
    EXTNAME(UUI qualifier 2)
:PROPERTY.SHRTNAME(UUIQUAL3) DT(V) DL(40) UUISEQ(4) NULLS(N)
    EXTNAME(UUI qualifier 3)
:PROPERTY.SHRTNAME(UUISUBJT) DT(V) DL(80) UUISEQ(5) NULLS(N)
    EXTNAME(UUI Subject)
:PROPERTY.SHRTNAME(SOURCE) DT(V) DL(32) UUISEQ(0) NULLS(Y)
    EXTNAME(Extract Source type)
:PROPERTY.SHRTNAME(SHRTDESC) DT(V) DL(250) UUISEQ(0) NULLS(Y)
    EXTNAME(Short Description)
:PROPERTY.SHRTNAME(LONGDESC) DT(L) DL(32700) UUISEQ(0) NULLS(Y)
    EXTNAME(Long description)
```

INSTANCE 2 OF FLG.BUSNSGP - Description

Object Type | Business Group Object Type

| Property | Value |
|---|---|
| Name | INSTANCE 2 OF FLG.BUSNS |
| Last Changed Date | 1993-07-26.10.00.00.0000 |
| Last Changed By | ROBIN |
| Extract Source type | SOURCE TYPE |
| Short Description | SHORT DESCRIPTION OF IN... |
| UUI Class | BO1 |
| UUI qualifier 1 | BO2 |

Value of selected property

INSTANCE 2 OF FLG.BUSNS

Start program...    Help

Select a property to see its value below.

INFORMATION CATALOG SYSTEM WITH OBJECT-DEPENDENT FUNCTIONALITY

This application is a continuation of application Ser. No. 08/134,355, filed Oct. 8, 1993, now abandoned.

BACKGROUND OF THE INVENTION

1. Field of the Invention

The present invention is directed generally to information management, and more particularly, to systems for cataloging information managed by one or more data processing nodes for use by non-data processing professionals having access thereto. Still more particularly, the invention relates to a system for providing catalog system product functionality within an environment of fully user extendable meta-information objects.

2. Problem to be Solved

One of the challenges facing administrators of databases used by businesses and other enterprises is to ensure that the information therein is fully and efficiently available to and accessible by non-data processing professionals. Knowledge workers are those persons within an enterprise whose function is to make decisions, or recommendations, in response to unanticipated events (e.g. changing business conditions). Those individuals must have ready access to all relevant information available to the enterprise, but may not know, or want to know, the unique naming schemes, expression statements or semantic modeling required to retrieve the information, particularly when that information extends over several information management systems having differing storage and delivery paradigms. Knowledge workers need to locate information on terms that are understandable and intuitively apparent to them.

A requirement therefore exists for an information catalog system that allows non-data processing professionals to define information objects on their own terms, and to search, query, retrieve and otherwise manipulate the "real world" information represented by those objects for consideration and analysis. This presents a challenge to product developers to produce a product whose objects are defined by the user base but whose functionality remains fixed. End users must be free to generate object types of their own creation but must be constrained in their ability to assign product functionality thereto.

SUMMARY OF THE INVENTION

In accordance with the foregoing objectives, a computer implemented information catalog database system is disclosed for cataloging information stored in one or more data storage resources under the control of one or more data processing nodes. The catalog system includes a cataloging service facility for performing one or more information cataloging functions to organize and present a graphical view of the information stored in the data storage resource. The information cataloging functions are categorized into a plurality of defined function categories. An object generation facility generates one or more meta-data objects corresponding to units of information stored in the data storage resource. The meta-data objects contain attributes defining characteristics of the information units to which they correspond and the mere-data objects are assigned to one or more of the function categories to define the information cataloging functions which may be performed on the meta-data objects. A user interface is provided for executing the information cataloging functions on the meta-data objects in response to user input.

BRIEF DESCRIPTION OF THE DRAWINGS

The objects, advantages and features of the present invention will be more clearly understood by reference to the following detailed disclosure and the accompanying drawing in which:

FIG. 9 illustrates the structure of a tag language file for generating an information object type subclass in accordance with the invention;

FIG. 14 illustrates a graphical user interface structure showing an information object type created by the data processing apparatus of FIG. 1.

DETAILED DESCRIPTION OF THE PREFERRED EMBODIMENTS

SYSTEM ENVIRONMENT

Figure 1:
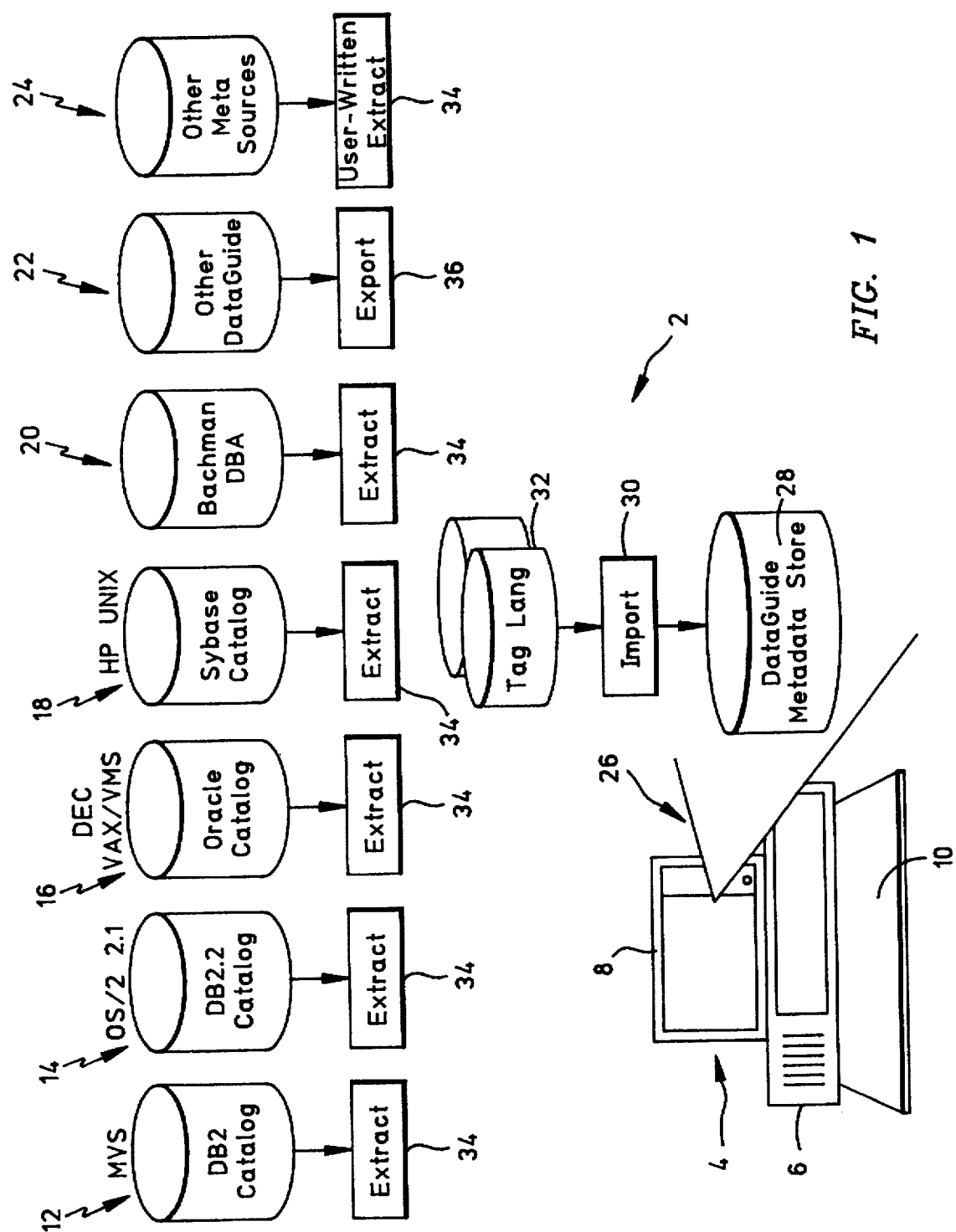
FIG. 1 is a system view of a data processing apparatus constructed in accordance with the present invention.

Referring now to FIG. 1, a data processing system 2 includes one or more information processing nodes 4 which may function as independent data processing devices or may be part of a network of shared data processing resources. The data processing system 2 will be populated in many cases with an assortment of digital computing devices, data storage libraries and other resources, including but not limited to, personal computers, work stations, mid-range computers and computer mainframe systems, all of which are preferably configured to share information with other resources in the data processing system.

In the system of FIG. 1, the data processing node 4 is a desktop IBM personal computer 6 having a microprocessor controller, operational program memory and one or more disk drives for permanent program storage. The data processing node 4 further includes a video monitor 8, a keyboard 10 and a cursor control device such as a mouse (not shown) for controlling a visual cursor representation displayed on the video monitor 8. As is known, the cursor can be used for making selections among graphical objects displayed on the video monitor 8, which objects represent functions provided by programs installed and running on the personal computer 6. An operating system, such as OS/2 2.1 from IBM, is installed on the personal computer 6 to manage system resources and assist in program execution.

The data processing node 4 is connected for information exchange with one or more data storage resources, each of which could be a data processing node running under its own operating system. For example, one node could be a mainframe computer system 12 running under an MVS operating system and managing a database such as IBM's DB2 catalog product. Another node could be a personal computer 14 running under IBM's OS/2 2.1 operating system and also managing a database such as IBM's DB2 catalog product. Still another node could be a mainframe computer system 16 running under the VMS operating system and managing another database product. Still another node could be a work station 18 running under the Unix operating system and managing another database product. Other nodes 20, 22 and 24 could be added as desired and could represent computer systems managing additional databases. They could also represent computers running other database catalog systems of the type described herein or could further represent other sources of meta information.

As used herein, "meta" information is any user defined information adopted as a convenience for describing data processing entities such as records, files and other objects contained in databases or other data processing resources. Meta information is the user's own description of object information which can be used to search, query, retrieve and otherwise manipulate enterprise information independently of the unique naming schemes, expression statements or semantic modeling imposed by the data processing resources that contain and manage the information.

In the system of FIG. 1, the data processing node 4 is configured for information exchange with the data processing nodes 12–24. The data processing node 4 is programmed to provide a database catalog system 26 for storing and manipulating meta information contained in a metadata store 28. The metadata store 28 is a local data storage resource that utilizes a memory device such as a disk drive to store meta information objects corresponding to information managed by one or more of the data processing nodes 12–24. The database catalog system 26 manages the metadata store as a relational database and provides sort-query-logic (SQL) support for accessing the meta data objects therein. The database catalog system 26 retrieves information from the data processing nodes 12–14 via its import facility 30, its tag language file storage facility 32, and various external extract facilities 34.

The facilities 30–34 represent functional services and resources available to the database catalog system 26, and operate in a manner now to be described. When a user of the database catalog system 26 desires to create meta information representations of information managed by one of the data processing nodes 12–20 and 24, an extract facility 34, which would be normally provided by a program running under each data processing node, is activated to retrieve such identification information from the data processing node as may be required to selectively retrieve units of information managed by that data processing node. The extract facility preferably includes a tag language facility that formats the identification information into one or more tag language statements for use by the database catalog system 26. The tag language statements are stored as a file in the tag language storage facility 32, which is a resource provided by the database catalog system 26. The import facility 30, which is a service provided by the database catalog system 26, interprets the tag language statements generated by the tag language facility 32 to generate meta information objects for storage in the metadata store 28.

When a user of the database system 26 desires to obtain information from the data processing node 22, a modified procedure is used. The data processing node 22 is a remote database catalog system which already contains meta information and is configured with its own local export facility 36. The export facility 36 converts meta information objects managed by the remote database catalog system into tag language statements that are placed in a file. Those tag language statements can then be routed around the tag language facility 32 and utilized directly by the import facility 30 for conversion into local meta information objects.

OPERATIONAL OVERVIEW

Figure 2:
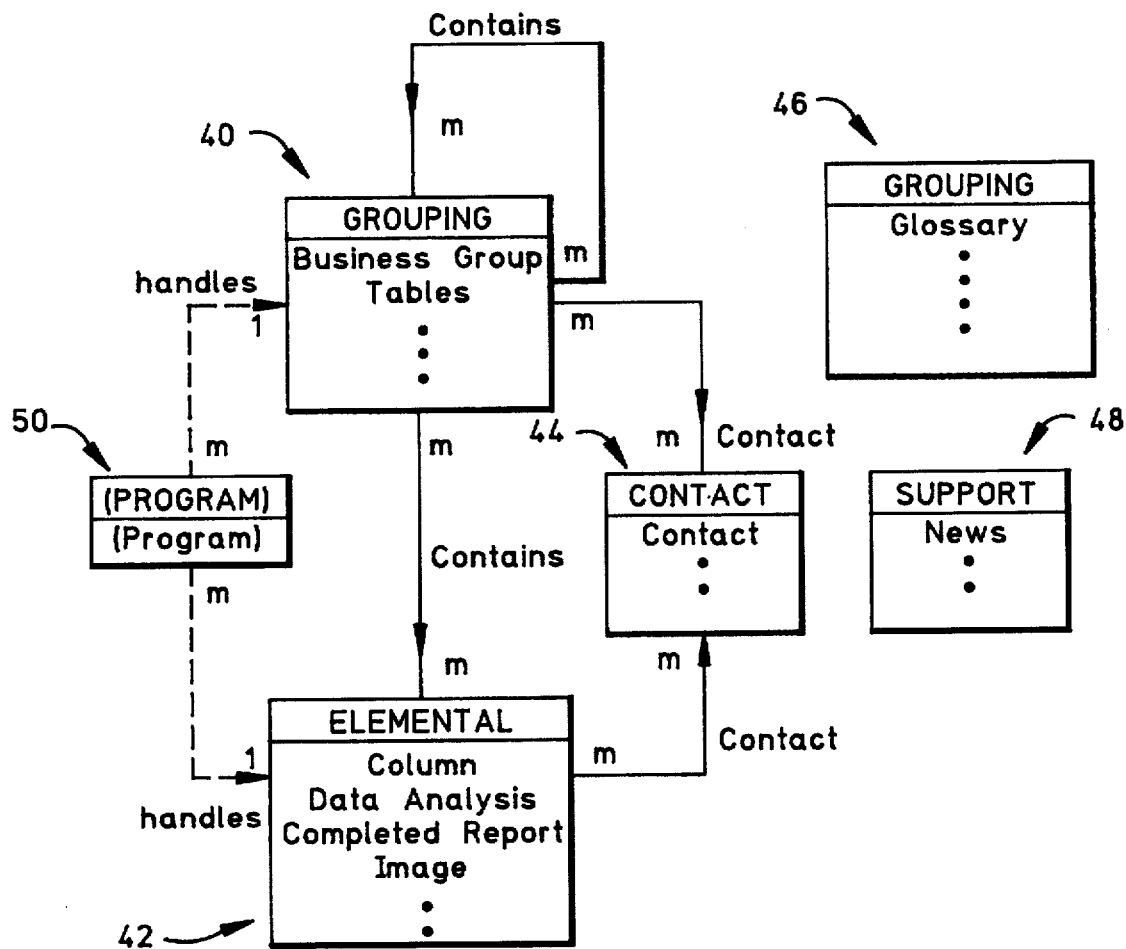
FIG. 2 is a block diagram showing a set of function category classes defined by the data processing apparatus of FIG. 1.

Referring now to FIG. 2, the database catalog system 26 allows knowledge workers to define meta information object types and object instances thereof corresponding to information managed by one or more data storage resources under the control of one or more data processing nodes, such as the nodes 12–24. In large measure, the user-defined object types are customizable and extendable by knowledge workers or data processing administrators thereof. The users determine what information should be captured, what it is to be called, and how it is organized. The database catalog 26 has no foreknowledge of the object types users will generate. However, the database catalog 26 must support the user-generated object type with a defined set of database catalog functional services that are appropriate to the object types generated by users.

To satisfy that objective, the database catalog system 26 defines a plurality of functional categories within which the user-defined object types may be generated. Each functional category represents a categorization and/or subclassing of a super class of functional services provided by the database catalog system 26. The functional categories to which the object types are assigned become part of the object type definition and limit the functions available to each object type. An object type is thus a data structure that may be thought of as a subclass object that encapsulates the functions inherited from the category class to which the object type belongs, together with one or more property attributes corresponding to information that the knowledge worker wishes to catalog. The object types can be populated with object instances that are generated by assigning values to the property attributes to create meta information objects that uniquely identify units of information to be cataloged by the knowledge worker.

In the database catalog system 26, the functional categories to which the object types may be assigned include, by way of example only, a "Grouping" category 40, an "Elemental" category 42, a "Contact" category 44, a "Dictionary" category 46, a "Support" category 48, and a "Program" category 50. All of the user-defined object types of the database catalog system 26 are placed in one of these six categories. Each category represents a distinct set of product functionality. The functional categories 40–50 may be further divided into two groups. A first group represented by categories 40, 42 and 50 contains "Information" objects corresponding to information from one or more data storage resources to be cataloged. A second group represented by categories 44, 46 and 48 contains "Support" objects corresponding to information that supports the cataloging of information defined by the Information objects. Examples of object types that may be assigned to the object categories 40–50 are illustrated in FIG. 2. These object types may be predefined within the database catalog system 26 and provided as an object type "starter set" for user convenience. It will be understood, however, that many other object types may be defined and users may well choose to delete the object type starter set in favor of a completely user-customized set of object types.

For purposes of discussion, however, a database catalog system is assumed to be populated with an object type starter set only, in which case the Grouping category 40 will be understood to contain a "Business Group" object type and a "Tables" object type. These object types represent information groupings containing information units or elements as members thereof. The purpose of the Business Group object type is to provide a generic container for organizing other grouping and elemental category object types such as tables, columns, queries, reports and images. The purpose of the Table object type is to describe the relevant properties of an SQL relational table or a client/server file.

In the example of FIG. 2, the Elemental category 42 contains "Column," "Data Analysis," "Completed Report" and "Image" object types. These object types are the individual members that could make up a Grouping object type. For example, the Column object type would complete the table definition established by a Table object type in which it is contained. The Data Analysis object type is used to represent some previously formulated analysis of data which a knowledge worker can request an informational application to perform. The analysis could be in the form of a query, a chart, a report, a spreadsheet, or an SQL request. The Completed Report object type represents fully processed information that is ready for presentation to a knowledge worker. The purpose of the Image object type is to represent image information such as that contained in blueprints, maps, schematics and other graphical representations.

In FIG. 2, the Contact category 44 contains a "Contact" object type whose purpose is to identity persons that can provide support and assistance for one or more Grouping or Elemental object types. The Dictionary category 46 contains a "Glossary" object type whose purpose is to provide clarification of terms used by other object types. The Support category 48 contains a "News" object type whose purpose is to provide a mechanism for knowledge workers to advise other users of the current state of the database catalog. The Program category 50 contains a "Program" object type that defines application programs capable of processing particular Grouping or Elemental object types. Advantageously, as described in more detail below, various relationships can be defined between object instances from certain related function categories for cross-referencing information provided by the object instances.

FUNCTION CATEGORIZATION SUBCLASSING

Figure 3:
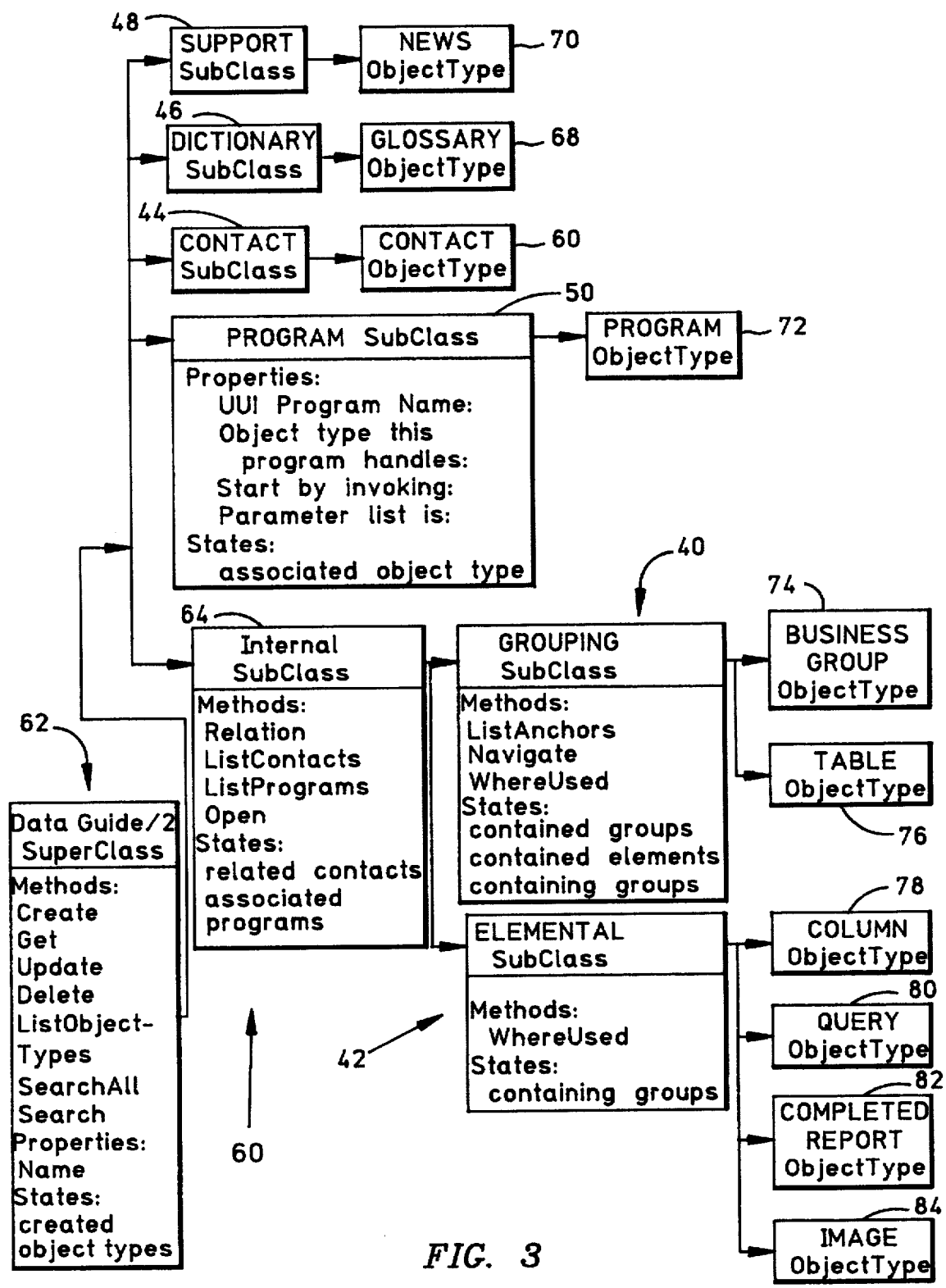
FIG. 3 is a block diagram showing the functionality assigned to the function category classes of FIG. 2 and further showing a set of object type subclasses generated by the data processing apparatus of FIG. 1.

Referring now to FIG. 3, an object oriented view of the database catalog system 26 is provided to illustrate some of the product functions that may be assigned to each of the functional categories 40–50. FIG. 3 shows a hierarchy of classes and subclasses encapsulating one or more product functions or "methods" together with "properties" defining characteristics of the information represented by the object types.

The database catalog system 26 contains a catalog service facility 60 for performing a plurality of information cataloging functions to organize and present a graphical view of information stored in one or more data storage resources. Some of these information cataloging functions are categorized in a mutually exclusive fashion by the manner in which they are assigned to the function categories defined above. In addition, there is a shared set of basic product functions represented by a database catalog function superclass 62. The superclass 62 contains a plurality of functional methods and a set of attributes or "properties" that are common to all object types that inherit the methods and property attributes of the superclass. The functional methods of the superclass 62 are the "Create," "Get," "Update," "Delete," "ListObjectTypes," "SearchAll," and "Search" methods. The defined superclass properties are a user provided Name, an Object Type Identifier, an Object Instance Identifier, a Last Modification Time and Date Identifier, and a Last Modification User Identifier.

The Create method is a routine that allows knowledge workers to create object types and object instances. The Get method allows knowledge workers to retrieve information about previously created object types and object instances. The Update method allows knowledge workers to modify previously created object types and object instances. The Delete method allows knowledge workers to delete previously created object types and object instances. The ListObjectTypes service allows knowledge workers to generate a list of all previously created object types. The SearchAll method provides a fuzzy search capability on any of the properties of object instances within a given object type. The Search method allows knowledge workers to search for object instances containing a specified property attribute across all object types.

The database catalog superclass 62 is subclassed into a fixed set of abstract object subclasses which are the functional categories 40–50 previously described, together with an internal subclass 64 that is subclassed into the Grouping and Elemental category subclasses 40 and 42. As can be seen in FIG. 3, the Contact, Dictionary and Support category subclasses 44, 46 and 48 do not provide additional methods beyond those contained in the superclass 62. The Contact, Glossary and News Object types 66, 68 and 70, which are created as subclasses of the Contact, Dictionary and Support category subclasses, inherit the methods and property attributes of the superclass. Moreover, knowledge workers may define additional property attributes for these and other object types created as subclasses of the Contact, Dictionary and Support category subclasses. These category subclasses are also extendable in that they permit knowledge workers to generate additional object type subclasses in addition to the starter set provided with the database catalog system 26.

The Program category subclass 50 does not contain any additional functional methods but does define additional property attributes that are inherited by the Program object type subclass 72. These additional property attributes include the Program Names of available application programs, the Object Types this Program Handles, the Program Startup Commands, and the Parameters required to invoke the programs using data resource information represented by the Grouping and Elemental object instances. Knowledge workers may also define additional property attributes for the Program object type 72. Unlike other function categories, however, knowledge workers may not create additional object types in the Program category, but may generate multiple instances of the Program object type 72.

The internal subclass 64 adds the "Relation," "ListContacts" and "ListPrograms" methods to the methods inherited by the Grouping and Elemental subclasses 40 and 42 and the object type subclasses thereof. The Relation method is used to establish a "contains" (i.e. parent-child) relationship between object instances that inherit the characteristics of the internal subclass 64, with the restriction that object instances that are further subclassed as Elemental object instances are always the target (e.g. child) of a contains-relationship established by the Relation method. The Relation method also permits a relationship to be established between object instances that inherit the characteristics of the internal subclass 64 with object instances that inherit the characteristics of the Contact category subclass 40. The ListContacts method reports on the status of this relationship by identifying the Contact object instances relating to a Grouping or Elemental object instance. Relatedly, one of the property attributes of a Program object instance is the object type the program handles. The ListPrograms and Open methods are provided to report on the relationship between Program object instances and the Grouping and Elemental object instances they specify.

The Grouping category subclass 40 adds the "ListAnchors," "Navigate" and "WhereUsed" methods to the Grouping object type subclasses 74 and 76 that inherit the characteristics of the Grouping category subclass. The ListAnchors method identifies all those Grouping object instances that are not contained in any other Grouping object type subclass (i.e., they are at the root of some classification scheme). The Navigate method identifies all object type instances that are directly contained within a specified object instance of a Grouping object type subclass. If any of the returned object type instances contain additional object type instances they are flagged to indicate that the Navigate method could be applied to those object instances as well. The WhereUsed method identifies all object instances that directly contain a selected object instance.

The Elemental category subclass 42 adds the WhereUsed method to the Elemental object type subclasses 78, 80, 82 and 84 that inherit the characteristics of the Elemental category subclass 42. This is the same WhereUsed method provided for the Grouping category subclass 40, except that Elemental object instances are barred from using the Relation method to relate to another object instance that has inherited characteristics from the Grouping or Elemental category subclasses.

DATABASE CATALOG IMPLEMENTATION

The provision and categorization of cataloging functions by the database catalog system 26 may be accomplished in several ways by persons skilled in the art based on the disclosure herein. The system 26 is preferably implemented by a general purpose computer, such as the data processing node 4 of FIG. 1, which executes a sequence of processing commands provided by a database catalog computer program. The program could be written in a variety of computer languages including the well known "C" programming language. In a preferred embodiment, the cataloging functions of the database catalog system 26 are implemented as a series of C language functions. Those functions preferably provide sort-query-logic (SQL) database access capability. As described in more detail below, the object types and object instances are generated as data structures having a plurality of defined fields corresponding to contiguous memory locations that store the information which defines the object types and the instances thereof. One of the data structure fields identifies the functional category of which the object type or object instance is a member. When a call is made to one of the cataloging functions that operate on object types and instances, the procedure reads the category identifier of the object type or instance data structure. If the category identifier is recognized, the function is executed. If not, an error message is displayed advising that the requested procedure is not available for the object type or object instance identified. In this way, the meta objects of the database catalog system 26 encapsulate the functions and properties which they inherit from the function category classes to which they belong. Such encapsulation could be similarly achieved using object oriented programming tools such as the C++ programming language.

META OBJECT DATA STRUCTURES

Figure 4:
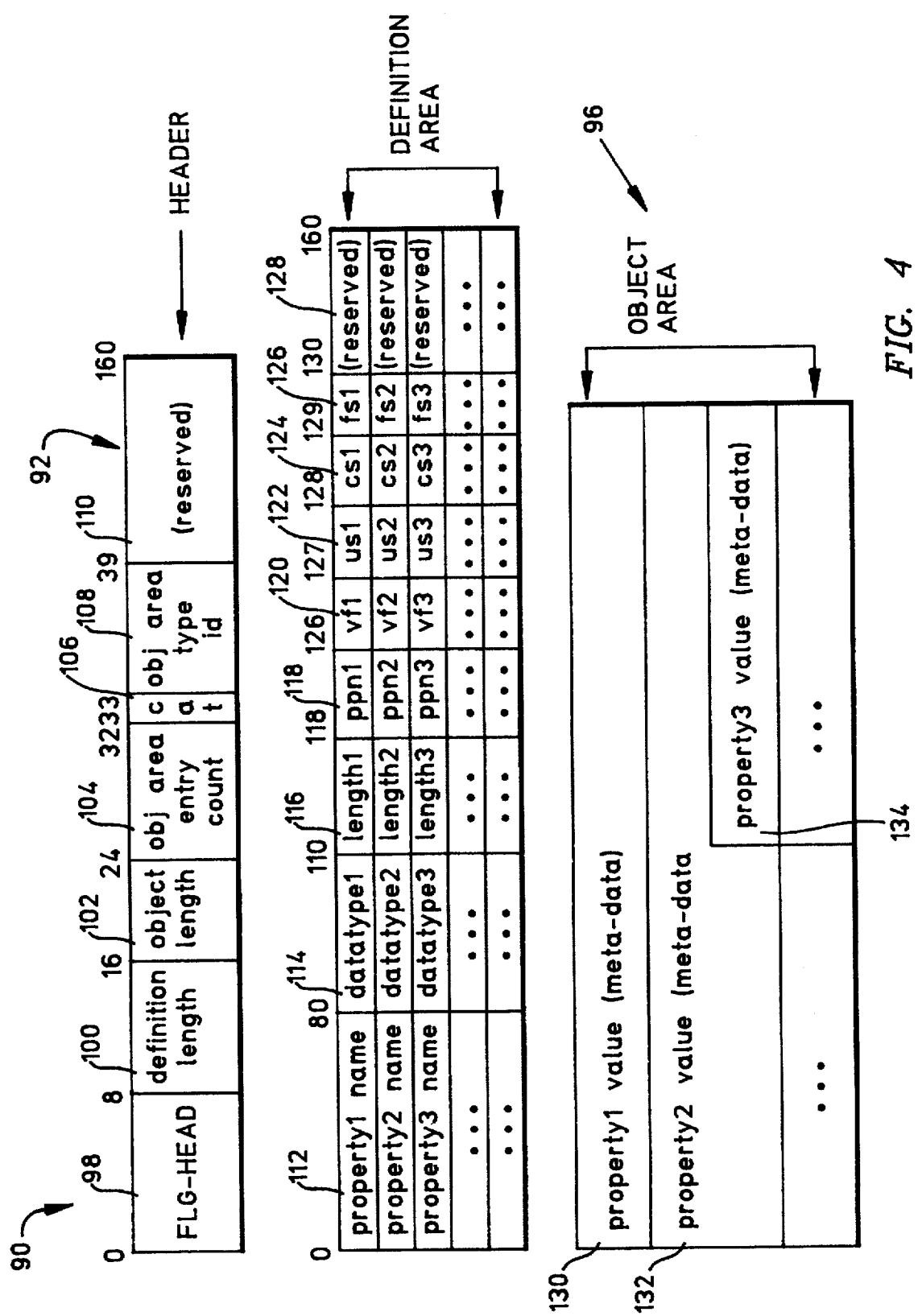
FIG. 4 is a diagrammatic view of the structure of an information object type class generated by the data processing apparatus of FIG. 1.

Referring now to FIG. 4, an exemplary structure of a meta data information object 90 of the present invention is shown. The information object 90 is a C language data structure having three contiguous parts, a header area 92, a definition area 94 and an object area 96. As stated above, the areas 92, 94 and 96 contain fields corresponding to contiguous memory locations for storing information about the object 90 represented by the data structure.

The header area 92 contains information about the nature and size of the data structure and includes a structure identifier 98, a definition area length identifier 100 indicating the size of the definition area, an object area length identifier 102 indicating the size of the object area, an object area entry count identifier 104 indicating the number of property values contained in the object area, a category descriptor 106 specifying which of the functional categories contains the object 90 as a subclass member thereof (there is only one), an object type identifier 108 and a reserved area 110.

The definition area 94 contains information about the property attributes of the object 90 and includes, for each property attribute, a property name identifier 112 containing the name of the property, a data type identifier 114 indicating the data type of the property, a length value 116 indicating the size of the property, a physical property name 118 indicating a physical name of the property, a value flag 120 indicating whether a value for the property is system-provided, user-supplied or optional, a universal unique identifier sequence number 122 indicating that the property is a member of a sequence of a set of universal unique identifiers that can be used for identifying the object 90 in relation to other objects in the database cataloging system 26 and in relation to other database cataloging systems and meta data stores, a case sensitivity flag 124 used for the Search function to distinguish between upper and lower case property values, a fuzzy search flag 126 used for the Search function to specify fuzzy or nonfuzzy searching, and a reserved area 128.

The object area 96 is used to contain values for the properties defined in the definition area 94. It contains plural fields, such as the value fields 130, 132 and 134, for identifying the property values of the object 90.

Figure 5:
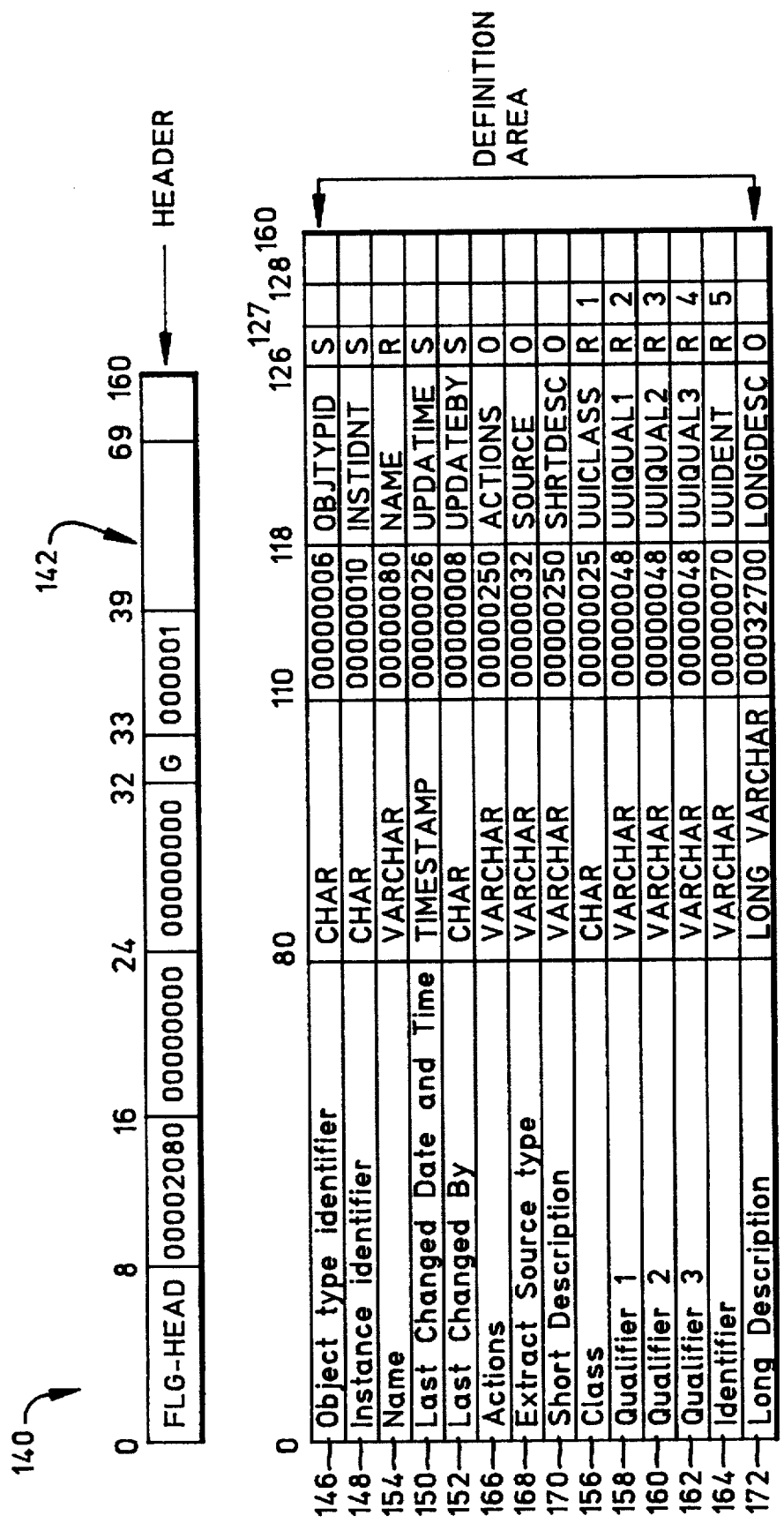
FIG. 5 is a diagrammatic view of an information object class generated by the data processing apparatus of FIG. 1.

Referring now to FIG. 5, an object type 140 of the Grouping category subclass 40 is shown. The object type 140 contains a header area 142 and a definition area 144, but no object area. Object types do not have object areas because they do not contain property values. Only object instances have assigned property values. The properties defined for the object type 140, which may be a Business Group object type, include system generated properties 146, 148, 150 and 152 representing the four global properties of the superclass 62 described above. The properties of the object type 140 further include a set of required properties provided by the knowledge worker, including the Name property 154 and the Unique Universal Identifiers 156, 158, 160, 162 and 164. Additional properties that may be optionally assigned, deleted, extended or otherwise manipulated include the Actions property 166 that specifies application programs capable of using the object type 140, an Extract Source Type Token 168 identifying the extractor program/process that created the tag language file used to populate the object type 140 with object instances, a Short Description 170 and a Long Description 172 providing additional information about the object instances populating the object type 140. Many other properties could also be provided as required to support the cataloging of meta information for use by knowledge workers.

Figure 6:
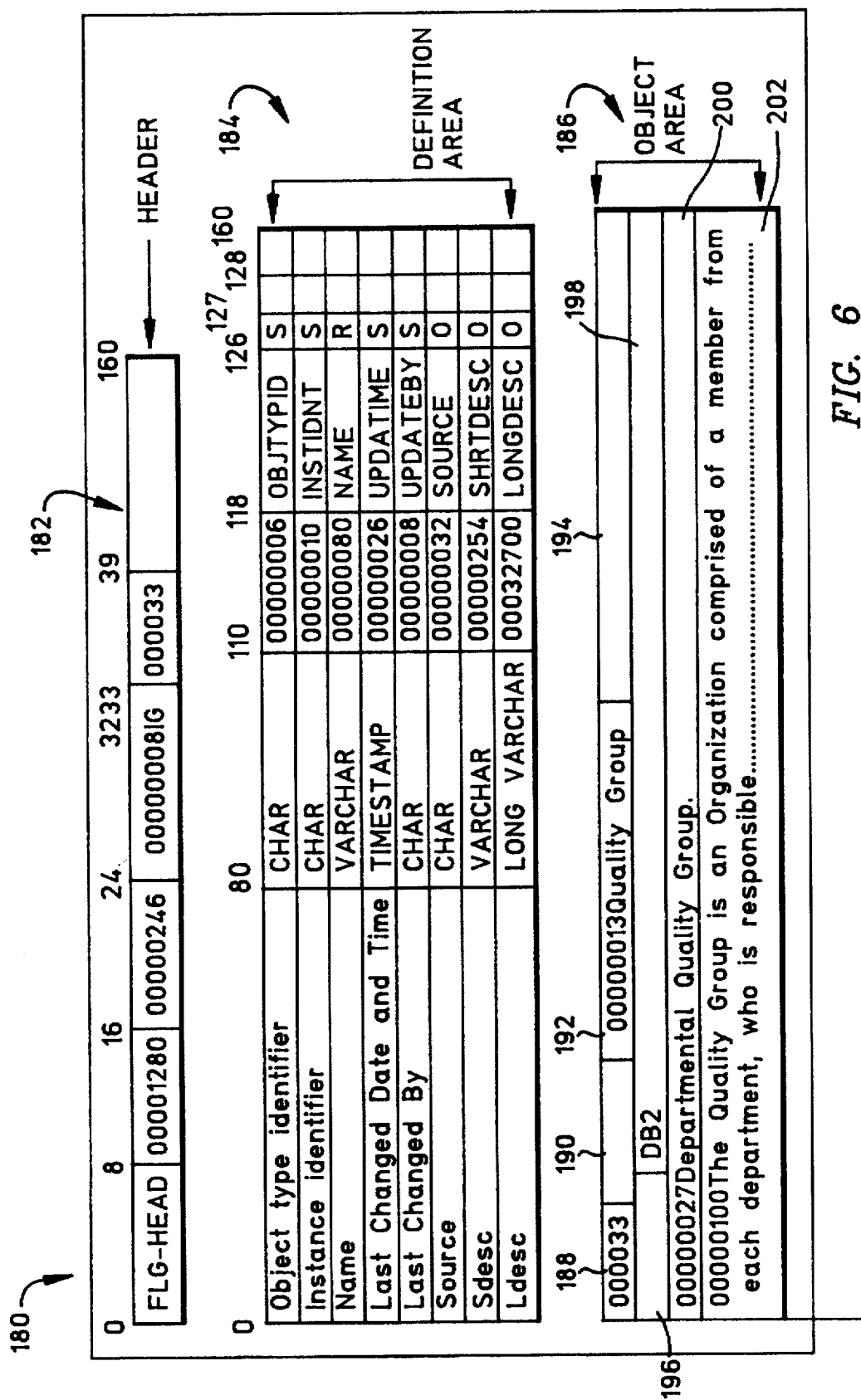
FIG. 6 is a diagrammatic view of an object instance generated by the data processing apparatus of FIG. 1.

Referring now to FIG. 6, an object instance 180 of a Business Group object type is shown. The object instance 180 includes a header area 182, a definition area 184 and an object area 186. It will be appreciated that the fields of the object area 186 sequentially correspond to the properties identified in the definition area 184. Thus, the object area field 188 contains a six character Object Identifier value. The adjacent Instance Identifier field 190 is left blank by the system for this object instance. The Name field 192 contains a twenty-one character name. The adjacent Last Changed Date and Time and Last Changed By fields 194 and 196 are left blank by the system for this object instance. The Source field 198 contains a three character value indicating the extract source type. The Short Description and Long Description fields 200 and 202 are filled with multicharacter values that provide additional meta information regarding this quality group instance.

USER INTERFACES

Figure 7:
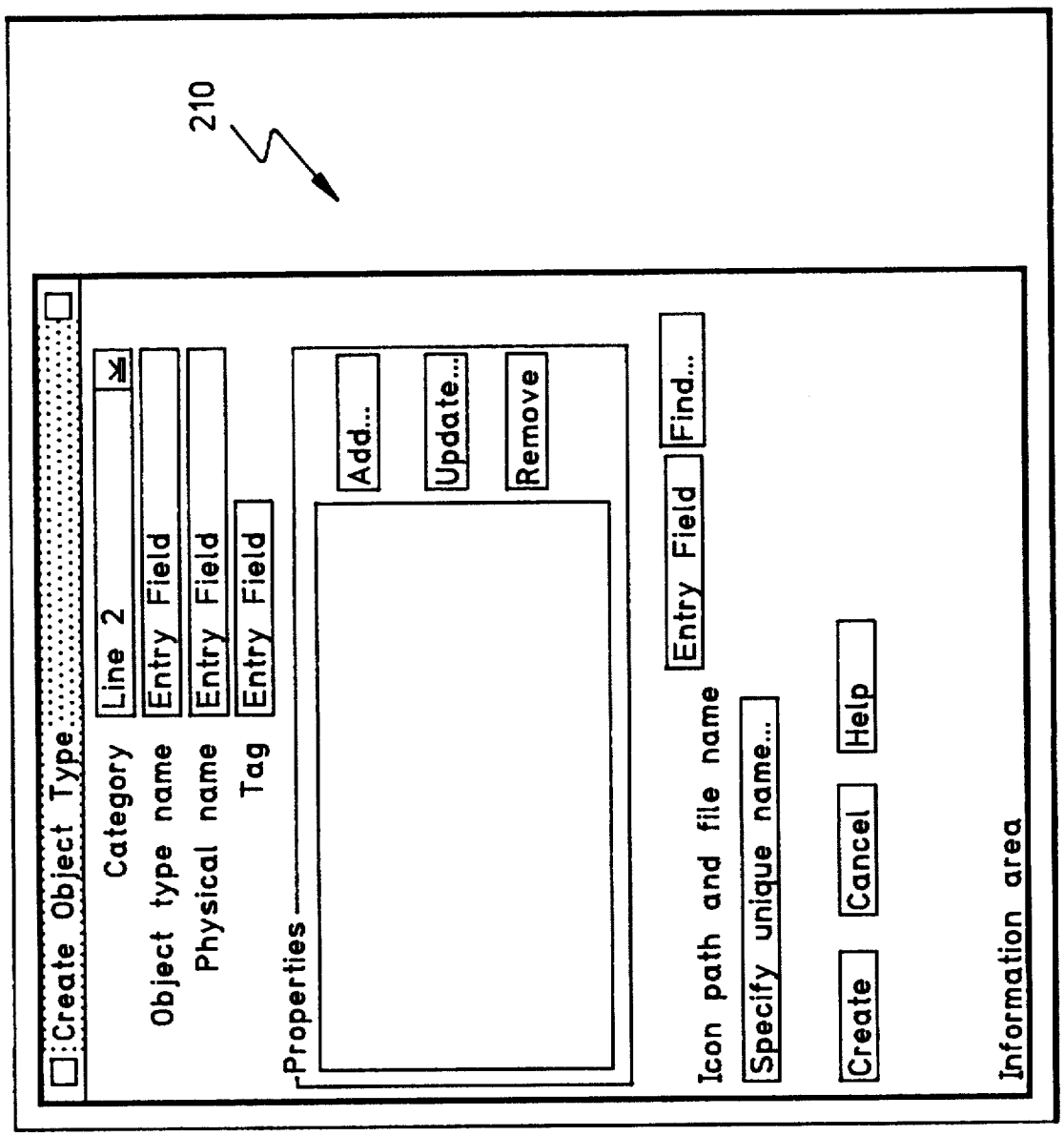
FIG. 7 illustrates a graphical user interface structure for creating an information object type in accordance with the invention.
Figure 8:
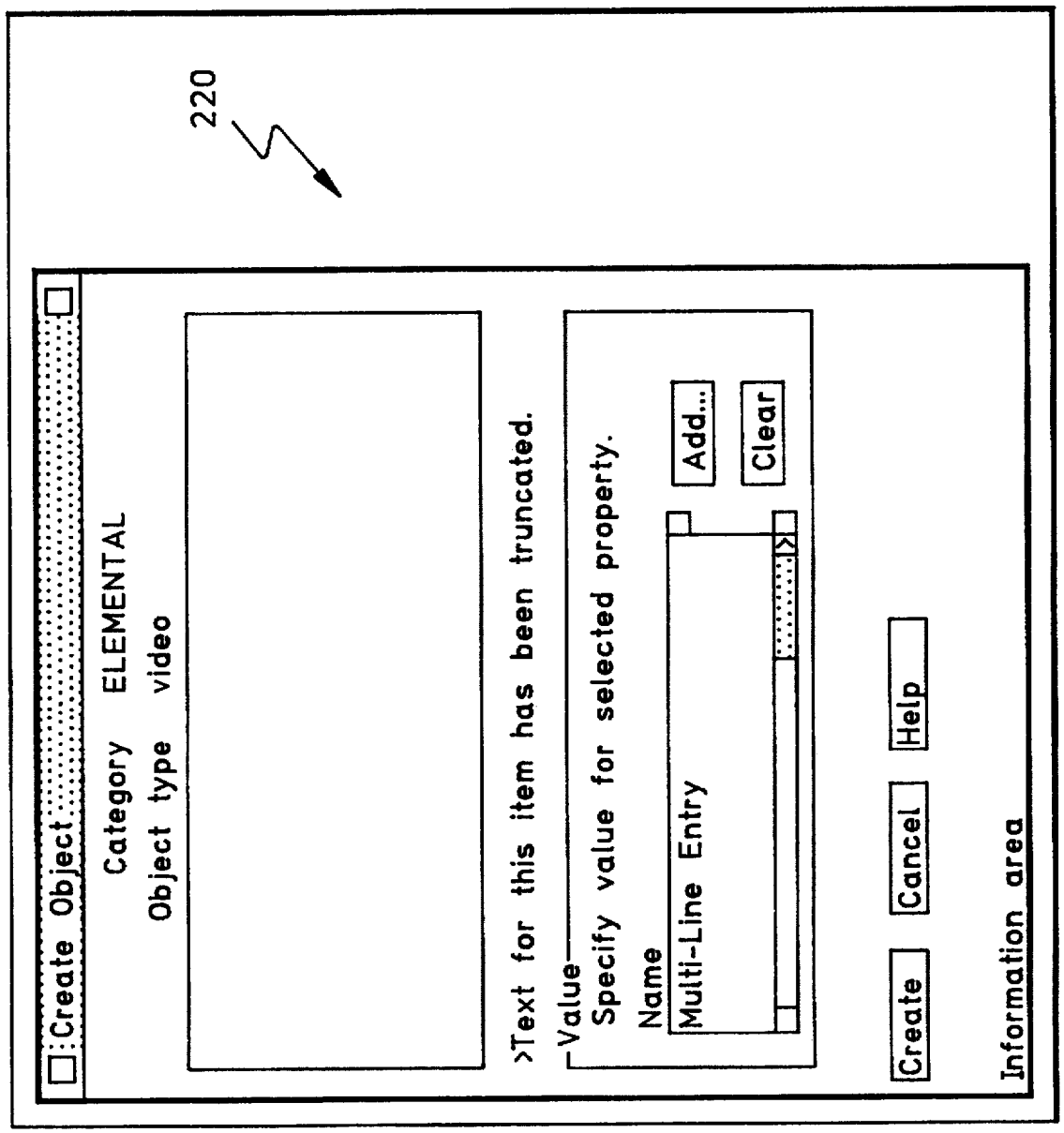
FIG. 8 illustrates a graphical user interface structure creating an object instance in accordance with the invention.

The database catalog system 26 can be configured to permit object type and object instance creation, deletion, editing and related manipulation in several ways. FIGS. 7 and 8 illustrate the operation of a graphical user interface system that allows knowledge workers to perform such functions using the video display 8, the keyboard 10 and the mouse input device previously described. FIG. 7 illustrates a graphical user interface panel 210 for creating an object type. The category subclass, various names and tags, together with the properties of this object type may all be specified in an interactive graphical input session. FIG. 8 illustrates a graphical user interface panel 220 for creating an object instance. The object type may be specified, together with the values of the properties defined by the object type, in an interactive graphical input session. Other graphical user interface panels for manipulating object types and object instances may also generated by the database catalog system 26 to provide functionality similar to that of the panels of FIGS. 7 and 8.

FIG. 9 illustrates an alternative batch input method using a series of tag language statements 230 for defining an object type. Object instances may be defined in similar fashion. A third alternative input method is to utilize an application programming interface (API) allowing access to the database cataloging system via an external application using C language function calls.

Figure 10:
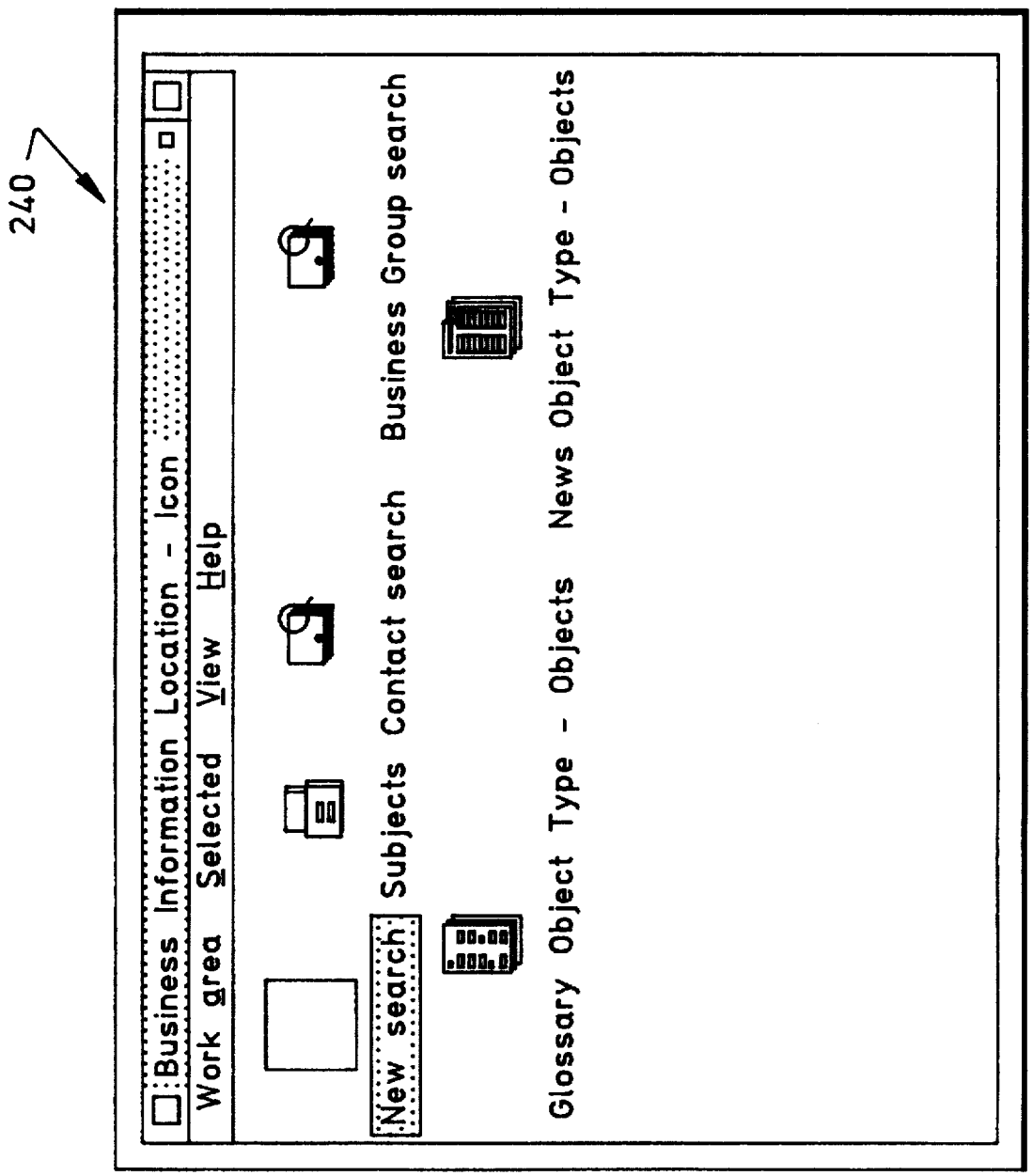
FIG. 10 illustrates a graphical user interface structure for selectively executing one or more cataloging services in response to user input.
Figure 11:
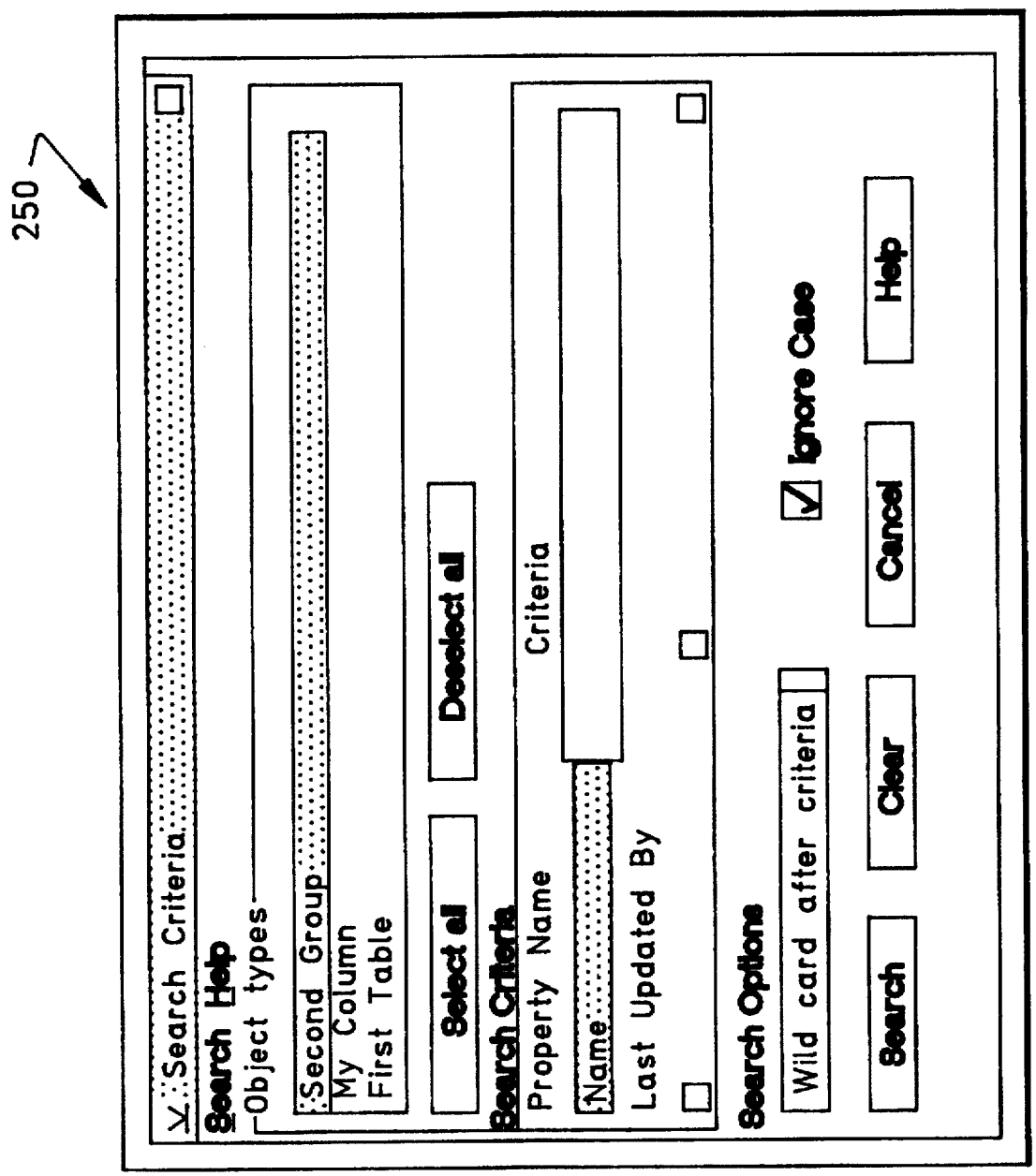
FIG. 11 illustrates a graphical user interface structure for executing a database catalog search in response to user input.
Figure 12:
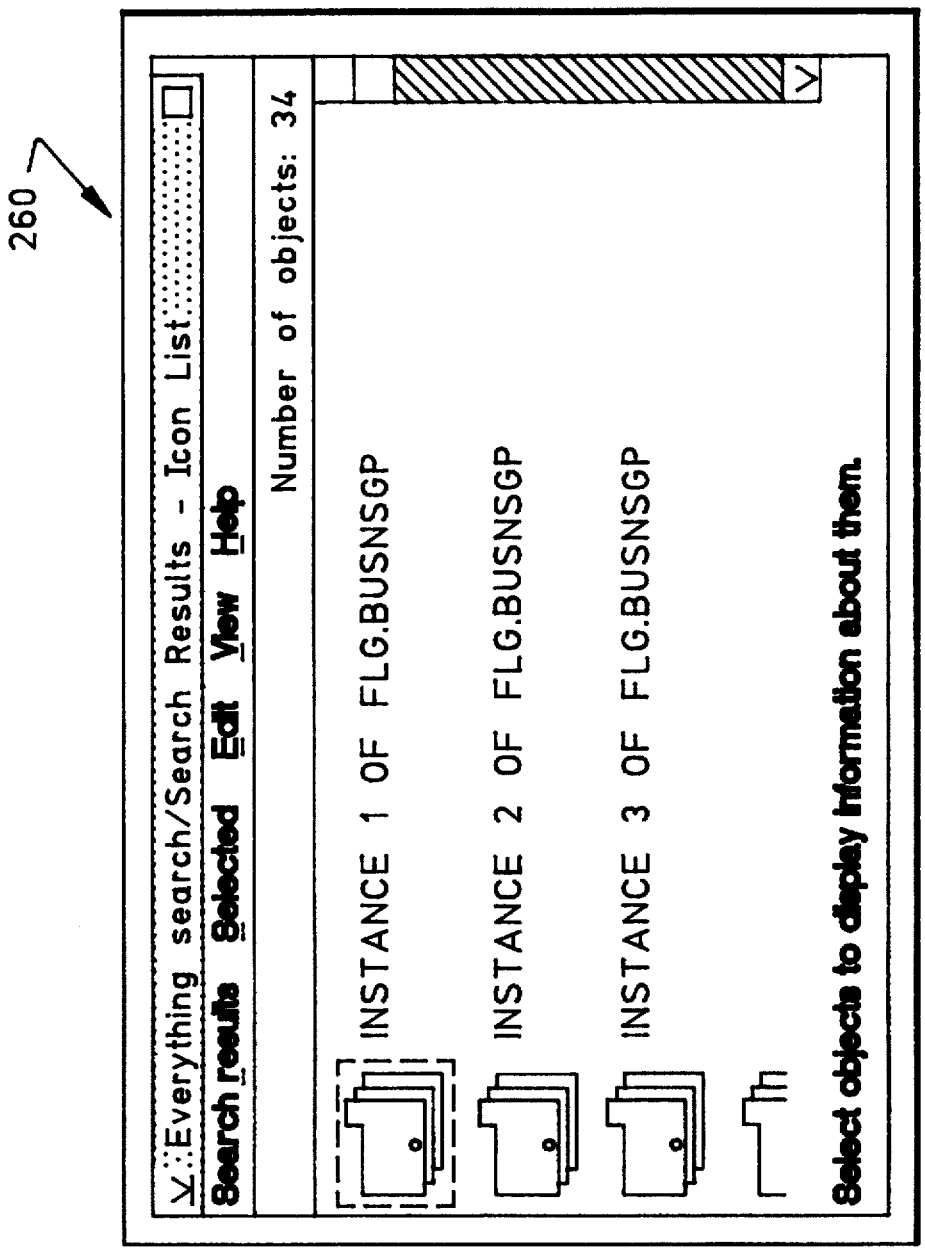
FIG. 12 illustrates a graphical user interface structure providing a list of object instances resulting from a database catalog search.
Figure 13:
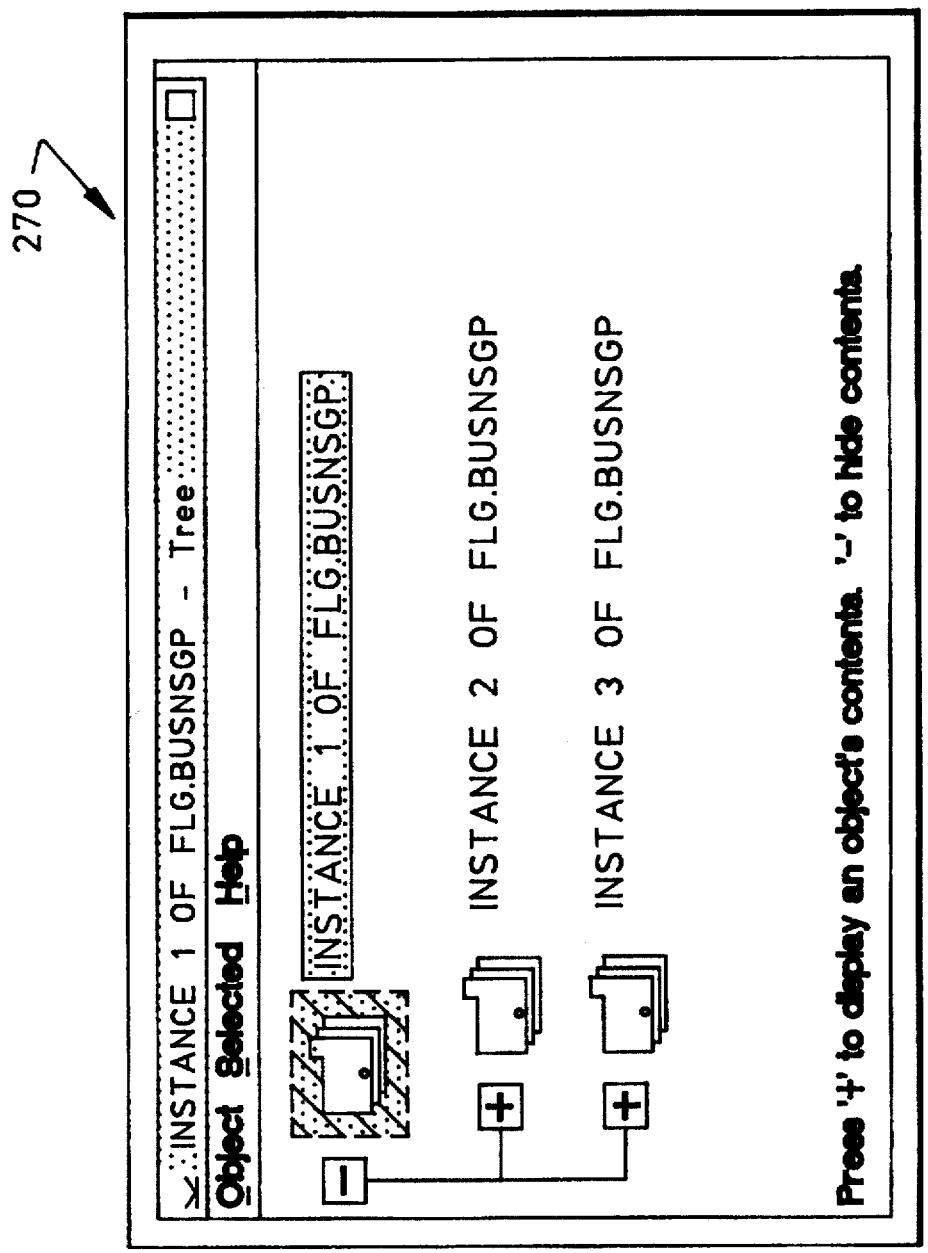
FIG. 13 illustrates a graphical user interface structure for navigating a selected set of object instances in the database catalog.

Once the metaadata store 28 is generated by creating one or more object types and object instances in accordance with the methods described above, database cataloging system 26 allows knowledge workers to access the meta information contained therein within the context of an interactive graphical user interface environment. Referring now to FIGS. 10–14, a series of exemplary graphical user interface panels intended for use by knowledge workers to execute various database cataloging and display functions are shown. FIG. 10 illustrates a main work area window 240 in which one or more database cataloging functions, such as the Search function, may be represented as user activatable icons. Additional icons may be provided to indicate stored searches which may be viewed by selecting the appropriate icons. FIG. 11 illustrates a search window 250 for implementing the Search procedure following selection of a Search icon in FIG. 10. FIG. 12 illustrates a window 260 containing the results of a previously executed search. FIG. 13 illustrates a window 270 containing the results of the Navigate method using a platform tree-view paradigm as the preferred way to graphically display the contains-relationships between related object instances. FIG. 14 illustrates a window 280 for graphically displaying a detailed description of an object instance. It will be appreciated that the window 280 provides a mechanism for viewing all of the meta information provided by the object instance, and it is this window which knowledge workers may be expected to consult most often in order to obtain a view of the information maintained in the metaadata store 28. Advantageously, the window 280 allows knowledge workers to invoke application programs that can process the information represented by the object instance business analysis.

Accordingly, an information catalog system with object-dependent functionality has been described. While various embodiments have been disclosed, it should be apparent that many variations and alternative embodiments would be apparent to those skilled in the art in view of the teachings herein. For example, the various cataloging functions and property attributes described herein are illustrated by way of example and not by way of limitation. The same holds true for the various data structures described herein. Additionally, the various graphical user interface objects described above will be understood to be representative only and not all inclusive. Persons skilled in the art intending to implement database catalog systems in accordance with the present invention will be expected to develop their own set of product functions, functional attributes, data structures and graphical user interface objects that are consistent with their own design requirements. It is understood, therefore, that the invention is not to be in any way limited except in accordance with the spirit of the appended claims and their equivalents.

We claim:

1. A computer implemented information catalog generation and modification system for cataloging information stored in a data storage resource, comprising:

cataloging means for performing one or more information cataloging functions to organize and present a graphical view of the information stored in the data storage resource for subsequent discovery by users;

editable catalog function categorization means including a user interface for allowing users to categorize said information cataloging functions into a plurality of cataloging function categories;

editable object means including a user interface for allowing users to generate a meta-database containing one or more meta-data objects corresponding to units of information stored in the data storage resource, said meta-data objects being generated based on meta-data relationships determined by a user and containing attributes defining characteristics of the information units to which they correspond and said meta-data objects being assigned to one or more of said cataloging function categories to define the information cataloging functions which may be performed on said meta-data objects; and discovery means including a user interface for allowing users to execute said information cataloging functions on said meta-data objects to provide user discovery of said units of information stored in the data storage resource.

2. The system of claim 1 wherein said editable object means includes means for user extension of the attributes of one or more of said meta-data objects to generate additional meta-data objects.

3. The system of claim 2 wherein said editable object means includes means for user prevention of the generation of additional meta-data objects in one or more function categories.

4. The system of claim 1 wherein said editable object means includes means for user generation of said attributes from a set of predefined attributes and means for user generation of additional attributes.

5. The system of claim 1 wherein said editable catalog function categorization means includes means for allowing users to categorize one or more cataloging functions into mutually exclusive function categories.

6. The system of claim 1 wherein said editable object means includes tag language means for allowing users to execute meta-data object setup commands.

7. The system of claim 1 wherein said cataloging means performs a searching function that includes searching meta-data objects based on the attributes thereof, an object listing function that includes generating lists of searched meta-data objects, a navigation function that includes generating navigatable meta-data object tree hierarchies, and a launching function that includes launching programs that utilize information defined by said meta-data objects.

8. The system of claim 7 wherein said editable catalog function categorization means includes means for allowing users to generate a grouping category containing said object listing and navigation functions.

9. The system of claim 7 wherein said editable catalog function categorization means includes means for allowing users to generate a program category containing said program launching function.

10. A computer implemented information catalog database system for cataloging information stored in one or more data storage resources, comprising:

editable object type means including a user interface for allowing users to register and create one or more meta-information object types as function category subclasses of a class of defined executable meta-database functional services, said meta-information object types being defined by the executable meta-database functional services available thereto and by one or more object type property attributes corresponding to information stored in said one or more data storage resources in order to provide user discovery of said information;

object instance means including a user interface for allowing users to generate one or more meta-information object instances of said meta-information object type subclasses, said meta-information object instances being generated by assigning values to the said object type property attributes to uniquely identify information stored in said one or more data storage resources in order to provide user discovery of said information; and meta-database service facility means including a user interface for allowing users to perform said executable meta-database functional services.

11. The system of claim 10 wherein said editable object type means further includes:

means for allowing users to register and create one or more support object types defined by the meta-database functional services available thereto and by one or more support object type property attributes corresponding to support information stored in said information catalog database system; and support object instance means for allowing users to generate one or more support object instances of said support object types, said support object instances being generated by assigning values to said support object type property attributes to uniquely identify support information stored in said information catalog database system.

12. The system of claim 10 wherein said editable object type means includes means for allowing users to extend the attributes of one or more of said object type subclasses.

13. The system of claim 12 wherein said editable object type means includes means for preventing generation of one or more of said object type subclasses.

14. The system of claim 10 wherein said editable object type means generates said object types as mutually exclusive subclasses of said meta-database functional services.

15. The system of claim 10 wherein said editable object type means generates said object types as overlapping subclasses of said meta-database functional services.

16. The system of claim 10 wherein said editable object type means and editable object instance means include tag language means including a user interface for allowing users to execute tag language object type and object instance setup commands.

17. The system of claim 10 wherein said editable object type means includes means for allowing users to generate a grouping object type subclass with executable object listing and navigation procedures available thereto for searching designated object instances and navigating through listings of designated object instances, respectively.

18. The system of claim 17 wherein said editable object category means includes means for allowing users to generate a program object type subclass with a program launching procedure available thereto for launching one or more executable programs utilizing one or more object instances generated by said object instance means.

19. A computer implemented information catalog database for cataloging meta-data objects representing information stored in one or more data storage resources, comprising:

a searchable meta-data store for storing a plurality of meta-data objects therein;

service facility means for performing a defined set of meta-database cataloging services on the meta-data objects contained in said searchable meta-data store;

editable means including a user interface for allowing users to map units of information contained in said one or more data storage resources to user-generated meta-data objects stored in said searchable meta-data store, said meta-data objects being defined by one or more information attributes and by subset categories of said meta-database services that operate on said meta-data objects; and means including a user interface for allowing users to execute said subset categories of meta-database cataloging services on the meta-data objects in order to provide user discovery of said information contained in said one or more data storage resources.

* * * * *